United States Patent
Boesen

(10) Patent No.: US 10,460,095 B2
(45) Date of Patent: Oct. 29, 2019

(54) EARPIECE WITH BIOMETRIC IDENTIFIERS

(71) Applicant: BRAGI GmbH, München (DE)

(72) Inventor: Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 205 days.

(21) Appl. No.: 15/719,378

(22) Filed: Sep. 28, 2017

(65) Prior Publication Data

US 2018/0096120 A1 Apr. 5, 2018

Related U.S. Application Data

(60) Provisional application No. 62/403,045, filed on Sep. 30, 2016.

(51) Int. Cl.
| | |
|---|---|
| *G06F 21/32* | (2013.01) |
| *H04R 1/10* | (2006.01) |
| *G10L 17/06* | (2013.01) |
| *G10L 17/22* | (2013.01) |
| *G10L 17/00* | (2013.01) |

(52) U.S. Cl.
CPC .......... *G06F 21/32* (2013.01); *H04R 1/1016* (2013.01); *H04R 1/1041* (2013.01); *G10L 17/005* (2013.01); *G10L 17/06* (2013.01); *G10L 17/22* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

James Vincent, "Bragi's Dash, The Wireless Earbuds of Our Dreams, Aren't Up and Running Yet", found at https://www.theverge.com/2015/9/6/9268495/bragi-dash-wireless-earbuds-hands-on, Sep. 15.*

(Continued)

*Primary Examiner* — Piotr Poltorak
(74) *Attorney, Agent, or Firm* — Goodhue, Coleman & Owens, P.C.

(57) ABSTRACT

A method of verifying an identity of a user using a set of earpieces includes communicating a first sound toward a tympanic membrane of the left ear, communicating a second sound toward a tympanic membrane of the right ear, receiving reflected sounds from an ear canal of the left ear, receiving reflected sounds from an ear canal of the right ear, comparing acoustic properties of the reflected sounds with acoustic properties stored in a memory device, and verifying the identity of the user if the acoustic properties of the reflected sounds match the stored acoustic properties.

13 Claims, 3 Drawing Sheets

(56) References Cited

U.S. PATENT DOCUMENTS

| | | | |
|---|---|---|---|
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| 5,787,187 A * | 7/1998 | Bouchard ............... A61B 5/12 |
| | | 382/115 |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,957,549 B2 * | 6/2011 | Chiba ................. H04R 1/1016 |
| | | 381/123 |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,742,471 B1 * | 8/2017 | Thoen ..................... H04W 4/80 |
| 10,015,623 B2 * | 7/2018 | Thoen ..................... H04L 1/245 |
| 10,237,644 B1 * | 3/2019 | Wang ..................... H04R 1/345 |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0008855 A1 * | 1/2004 | Ham ....................... H04R 1/105 |
| | | 381/381 |

(56) References Cited

U.S. PATENT DOCUMENTS

| | | |
|---|---|---|
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0149261 A1* | 6/2007 | Huddart ............. H04R 5/033 455/575.2 |
| 2007/0195963 A1* | 8/2007 | Ko ............. H04S 7/306 381/26 |
| 2008/0076489 A1* | 3/2008 | Rosener ............. H04M 1/6066 455/575.2 |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0060240 A1* | 3/2009 | Coughlan ............. H04M 1/6016 381/314 |
| 2009/0061819 A1* | 3/2009 | Coughlan ............. G07C 9/00158 455/410 |
| 2009/0073070 A1 | 3/2009 | Rofougaran |
| 2009/0097689 A1* | 4/2009 | Prest ............. H04R 1/028 381/380 |
| 2009/0105548 A1 | 4/2009 | Bart |
| 2009/0154739 A1* | 6/2009 | Zellner ............. H04R 1/1041 381/311 |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0119077 A1* | 5/2010 | Platz ............. A61F 11/08 381/72 |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0217950 A1* | 9/2011 | Kozlay ............. H04W 12/003 455/410 |
| 2011/0239497 A1 | 10/2011 | McGuire et al. |
| 2011/0286615 A1 | 11/2011 | Olodort et al. |
| 2011/0314530 A1* | 12/2011 | Donaldson ............. G06F 21/83 726/7 |
| 2012/0057740 A1 | 3/2012 | Rosal |
| 2012/0058727 A1* | 3/2012 | Cook ............. H04R 5/02 455/41.3 |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1* | 8/2014 | Kurtz ............. H04R 3/12 381/74 |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0309549 A1* | 10/2014 | Selig ............. H04R 1/1041 600/559 |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0148989 A1 | 5/2015 | Cooper et al. |
| 2015/0172827 A1* | 6/2015 | Sharpe ............. G06F 21/31 381/312 |
| 2015/0245127 A1 | 8/2015 | Shaffer |
| 2015/0373467 A1 | 12/2015 | Gelter |
| 2015/0373474 A1 | 12/2015 | Kraft et al. |
| 2016/0007933 A1* | 1/2016 | Duddy ............. A61B 5/6803 600/595 |
| 2016/0026781 A1* | 1/2016 | Boczek ............. G06K 9/00885 726/18 |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0093207 A1* | 3/2016 | Di Censo ............. H04R 1/1091 340/944 |
| 2016/0125892 A1 | 5/2016 | Bowen et al. |
| 2016/0236066 A1* | 8/2016 | Edelstein ............. A63C 17/015 |
| 2016/0353195 A1* | 12/2016 | Lott ............. H04R 1/1041 |
| 2016/0353196 A1 | 12/2016 | Baker et al. |
| 2016/0360350 A1 | 12/2016 | Watson et al. |
| 2017/0049335 A1* | 2/2017 | Duddy ............. A61B 5/0205 |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1* | 3/2017 | Qian ............. H04R 1/105 |
| 2017/0078781 A1* | 3/2017 | Qian ............. H04R 1/1016 |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0142511 A1 | 5/2017 | Dennis |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0171046 A1* | 6/2017 | Flood ............. H04B 1/385 |
| 2017/0178631 A1 | 6/2017 | Boesen |
| 2017/0180842 A1 | 6/2017 | Boesen |
| 2017/0180843 A1* | 6/2017 | Perianu ............. H04W 76/10 |
| 2017/0180897 A1 | 6/2017 | Perianu |
| 2017/0188127 A1 | 6/2017 | Perianu et al. |
| 2017/0188132 A1 | 6/2017 | Hirsch et al. |

(56) References Cited

U.S. PATENT DOCUMENTS

| | | | |
|---|---|---|---|
| 2017/0193978 A1 | 7/2017 | Goldman | |
| 2017/0195829 A1 | 7/2017 | Belverato et al. | |
| 2017/0208393 A1 | 7/2017 | Boesen | |
| 2017/0214987 A1 | 7/2017 | Boesen | |
| 2017/0215016 A1 | 7/2017 | Dohmen et al. | |
| 2017/0230752 A1 | 8/2017 | Dohmen et al. | |
| 2017/0251933 A1 | 9/2017 | Braun et al. | |
| 2017/0257698 A1 | 9/2017 | Boesen et al. | |
| 2017/0263236 A1 | 9/2017 | Boesen et al. | |
| 2017/0273622 A1 | 9/2017 | Boesen | |
| 2017/0347348 A1* | 11/2017 | Masaki | H04W 72/0406 |
| 2018/0307818 A1* | 10/2018 | Yano | G06F 21/32 |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 4/1981 |
| GB | 2508226 | A | 5/2014 |
| WO | WO2007034371 | A2 * | 9/2006 |
| WO | 2008103925 | A1 | 8/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |

OTHER PUBLICATIONS

Sean O'Kane, "The first truly wireless earbuds are here, and they're awesome", found at https://www.theverge.com/2015/1/9/7512829/wireless-earbuds-ces-2015-bragi-dash, Jan. 15.*

Author Unknown, "Bragi Dash—the world's first wireless smart in-ear headphone", found at ispo.blog.messe-muenchen.de/2015/05/26/bragi-dash-das-weltweit-erste-drahtlose-smart-in-ear-headset/, May 15.*

Looney et al., "The In-theEar Recording Concept", 2154-2287/12, IEEE Pulse, Dec. 12.*

David Morris, "Forget the iWatch. Headphones are the original wearable tech", found at fortune.com/2014/06/24/apple-beatas-headphones-wearable-tech-biometrics/, Jun. 14.*

Hurely et al., "The Ear as a Biometric", 15th European Signal Processing Conference, (EUSIPCO 2007), Poznan, Poland, Sep. 3-7, 2007.*

Akkermans, "Acoustic Ear Recognition for Person Identification", Automatic Identification Advanced Technologies, 2005 pp. 219-223.

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI Is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready to Rumble, A Lot to Be Done Over Christmas (Dec. 22, 2014).

BRAGI Update—Memories From April—Update on Progress (Sep. 16, 2014).

BRAGI Update—Memories from May—Update on Progress—Sweet (Oct. 13, 2014).

BRAGI Update—Memories From One Month Before Kickstarter—Update on Progress (Jul. 10, 2014).

BRAGI Update—Memories From the First Month of Kickstarter—Update on Progress (Aug. 1, 2014).

BRAGI Update—Memories From the Second Month of Kickstarter—Update on Progress (Aug. 1, 2014).

BRAGI Update—New People @Bragi—Prototypes (Jun. 26, 2014).

BRAGI Update—Office Tour, Tour to China, Tour to CES (Dec. 11, 2014).

BRAGI Update—Status on Wireless, Bits and Pieces, Testing—Oh Yeah, Timeline(Apr. 24, 2015).

BRAGI Update—The App Preview, The Charger, The SDK, BRAGI Funding and Chinese New Year (Feb. 11, 2015).

BRAGI Update—What We Did Over Christmas, Las Vegas & CES (Jan. 19, 2014).

BRAGI Update—Years of Development, Moments of Utter Joy and Finishing What We Started(Jun. 5, 2015).

BRAGI Update—Alpha 5 and Back to China, Backer Day, On Track(May 16, 2015).

BRAGI Update—Beta2 Production and Factory Line(Aug. 20, 2015).

BRAGI Update—Developer Units Shipping and Status(Oct. 5, 2015).

BRAGI Update—Developer Units Started Shipping and Status (Oct. 19, 2015).

BRAGI Update—Developer Units, Investment, Story and Status(Nov. 2, 2015).

BRAGI Update—Getting Close(Aug. 6, 2015).

BRAGI Update—On Track, Design Verification, How It Works and What's Next(Jul. 15, 2015).

BRAGI Update—Status on Wireless, Supply, Timeline and Open House@BRAGI(Apr. 1, 2015).

BRAGI Update—Unpacking Video, Reviews on Audio Perform and Boy Are We Getting Close(Sep. 10, 2015).

Healthcare Risk Management Review, "Nuance updates computer-assisted physician documentation solution" (Oct. 20, 2016).

Hoffman, "How to Use Android Beam to Wirelessly Transfer Content Between Devices", (Feb. 22, 2013).

Hoyt et. al., "Lessons Learned from Implementation of Voice Recognition for Documentation in the Military Electronic Health Record System", The American Health Information Management Association (2017).

Hyundai Motor America, "Hyundai Motor Company Introduces a Health + Mobility Concept for Wellness in Mobility", Fountain Valley, California (2017).

International Search Report & Written Opinion, PCT/EP2016/070231 (dated Nov. 18, 2016).

Last Push Before the Kickstarter Campaign Ends on Monday 4pm CET (Mar. 28, 2014).

Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).

Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).

Staab, Wayne J., et al., "A One-Size Disposable Hearing Aid is Introduced", The Hearing Journal 53(4):36-41) Apr. 2000.

Stretchgoal—It's Your Dash (Feb. 14, 2014).

Stretchgoal—The Carrying Case for the Dash (Feb. 12, 2014).

Stretchgoal—Windows Phone Support (Feb. 17, 2014).

The Dash + The Charging Case & The BRAGI News (Feb. 21, 2014).

(56) References Cited

OTHER PUBLICATIONS

The Dash—A Word From Our Software, Mechanical and Acoustics Team + An Update (Mar. 11, 2014).
Update From BRAGI—$3,000,000—Yipee (Mar. 22, 2014).
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

EARPIECE WITH BIOMETRIC IDENTIFIERS

PRIORITY STATEMENT

This application claims priority to U.S. Provisional Patent Application 62/403,045, filed on Sep. 30, 2016, and entitled "Earpiece with Biometric Identifiers", hereby incorporated by reference in its entirety.

FIELD OF THE INVENTION

The present invention relates to wearable devices. More particularly, but not exclusively, the present invention relates to earpieces.

BACKGROUND

Device security is a major concern to many businesses and consumers. Failure to maintain device security can result in a number of issues. Wireless earpieces are a new class of consumer electronic device with a great deal of commercial potential. In addition to allowing their users to listen to media without a direct physical connection to another electronic device, wireless earpieces can potentially store personal information or other information of value to a person. What is needed is a method and system for identifying the user of a wireless earpiece in order to provide appropriate access controls to the device and/or protect information on the device or other devices which are accessible using the wireless earpieces.

SUMMARY

Therefore, it is a primary object, feature, or advantage of the present invention to improve over the state of the art.

It is a further object, feature, or advantage of the present invention to verify the identity of a user using the acoustic properties of both of the user's ear canals with an earpiece.

It is a still further object, feature, or advantage of the present invention to verify the identity of the user using the acoustic properties of one or more of a user's ear canals in addition to a biometric characteristic with an earpiece.

One or more of these and/or other objects, features, or advantages will become apparent from the specification and claims that follow. No single embodiment need include meet or achieve, each and every object, feature, or advantage as different embodiments may have different objects, features, or advantages.

According to one aspect, the set of earpieces having a left earpiece and a right earpiece includes an earpiece housing having an outer base and an inner tip, wherein each inner tip is positioned inside an ear canal of a user, a speaker operatively connected to each inner tip, wherein each speaker is configured to communicate a sound toward a tympanic membrane of the user in response to a command from the user, an internal microphone operatively connected to each inner tip, wherein each internal microphone is configured to receive reflected sounds from each ear canal and each tympanic membrane of the user, a transceiver disposed within each earpiece housing, a processor disposed within each earpiece housing, and a memory device disposed within each earpiece housing, wherein an identity of the user is verified if acoustic properties of the reflected sounds received by the internal microphone of the left earpiece substantially match acoustic properties of a user's left ear canal stored in the memory device of the left earpiece using the processor of the left earpiece and acoustic properties of the reflected sounds received by the internal microphone of the right earpiece substantially match acoustic properties of a user's right ear canal stored in the memory device of the right earpiece using the processor of the right earpiece.

According to another aspect, an earpiece includes an earpiece housing having an outer base and an inner tip, a speaker operatively connected to the inner tip, wherein the speaker is configured to communicate a sound toward a tympanic membrane of a user in response to a command from the user, an internal microphone operatively connected to the inner tip, wherein the internal microphone is configured to receive reflected sounds from each ear canal and each tympanic membrane of the user, a sensor operatively connected to the earpiece housing, wherein the sensor is configured to sense a biometric characteristic of the user, a transceiver disposed within the earpiece housing, a memory device disposed within the earpiece housing, and a processor disposed within the earpiece housing and operatively connected to the sensor, the transceiver, the speaker, the internal microphone and the memory device, wherein an identity of the user is verified if acoustic properties of the reflected sounds received by the internal microphone substantially match acoustic properties of a user's ear canal stored in the memory device and the biometric characteristics sensed by the sensor substantially match biometric characteristics stored in the memory device.

According to another aspect, an earpiece includes an earpiece housing having an outer base and an inner tip, a speaker operatively connected to the inner tip, wherein the speaker is configured to communicate a sound toward a tympanic membrane of a user in response to a command from the user, an internal microphone operatively connected to the inner tip, wherein the internal microphone is configured to receive reflected sounds from each ear canal and each tympanic membrane of the user, an external microphone operatively connected to the outer base, wherein the external microphone is configured to receive sounds from the user, a transceiver disposed within the earpiece housing, a memory device disposed within the earpiece housing, and a processor disposed within the earpiece housing and operatively connected to the sensor, the transceiver, the speaker, the internal microphone and the memory device, wherein an identity of the user is verified if acoustic properties of the reflected sounds received by the internal microphone substantially match acoustic properties of a user's ear canal stored in the memory device and audio characteristics associated with the sounds received from the external microphone substantially match audio characteristics stored in the memory device.

According to another aspect, a method of verifying an identity of a user using a set of earpieces having a left earpiece and a right earpiece includes communicating a first sound using a speaker of the left earpiece positioned toward a tympanic membrane of the left ear, communicating a second sound using a speaker of the right earpiece positioned toward a tympanic membrane of the right ear, receiving reflected sounds from an ear canal of the left ear derived from the first sound at an internal microphone of the left earpiece, receiving reflected sounds from an ear canal of the right ear derived from the second sound at an internal microphone of the right earpiece, comparing acoustic properties of the reflected sounds of the left earpiece with acoustic properties of the user's left ear canal stored in a memory device of the left earpiece, comparing acoustic properties of the reflected sounds of the right earpiece with acoustic properties of the user's right ear canal stored in a memory device of the right earpiece, and verifying the identity of the user if the acoustic properties of the reflected sounds of the left earpiece substantially match the acoustic properties of the user's left ear canal and the acoustic properties of the reflected sounds of the right earpiece substantially match the acoustic properties of the user's right ear canal.

According to another aspect, a method of verifying an identity of a user using an earpiece includes communicating a sample sound using a speaker of the earpiece positioned toward a tympanic membrane, receiving reflected sounds from an ear canal derived from the sample sound at an internal microphone of the earpiece, receiving sounds from the user at an external microphone of the earpiece, comparing acoustic properties of the reflected sounds with acoustic properties of a user's ear canal stored in a memory device of the earpiece, comparing audio characteristics associated with the sounds received from the user with audio characteristics stored in the memory device, and verifying the identity of the user if the acoustic properties of the reflected sounds substantially match the acoustic properties of the user's ear canal and the audio characteristics associated with the sounds received from the user substantially match the audio characteristics stored in the memory device.

According to another aspect, a method of verifying an identity of a user using an earpiece includes communicating a sample sound using a speaker of the earpiece positioned toward a tympanic membrane, receiving reflected sounds from an ear canal derived from the sample sound at an internal microphone of the earpiece, sensing a biometric characteristic at a sensor of the earpiece, comparing acoustic properties of the reflected sounds with acoustic properties of the user's ear canal stored in a memory device of the earpiece, comparing the biometric characteristic sensed by the sensor with user biometric characteristics stored in the memory device, and verifying the identity of the user if the acoustic properties of the reflected sounds substantially match acoustic properties of the user's ear canal and the biometric characteristic sensed by the sensor substantially match user biometric characteristics stored in the memory device.

According to another aspect, a method of verifying an identity of a user using a set of earpieces comprising a left earpiece and a right earpiece is provided. The method includes transducing sound at a speaker of the left earpiece to direct the sound towards a left external auditory canal of the user, receiving reflected sound at a microphone of the left earpiece, the microphone of the left earpiece positioned to receive reflections from the sound transduced at the speaker of the left earpiece and reflected from the left external auditory canal of the user, transducing sound at a speaker of the right earpiece to direct the sound towards a right external auditory canal of the user, receiving reflected sound at a microphone of the right earpiece, the microphone of the right earpiece positioned to receive reflections from the sound transduced at the speaker of the right earpiece and reflected from the right external auditory canal of the user, and processing the reflected sound received at the microphone of the left earpiece to determine a property of the left external auditory canal of the user and processing the reflected sound received at the microphone of the right earpiece to determine a property of the right external auditory canal of the user. The method further includes determining if both the property of the left external auditory canal of the user and the property of the right external auditory canal of the user match known properties for a user identity and if so, verifying the identity of the user. The processing the reflected sound received at the microphone of the left earpiece to determine the property of the left external auditory canal of the user and processing the reflected sound received at the microphone of the right earpiece to determine the property of the right external auditory canal of the user may all occurs at a processor disposed in the left earpiece or a processor disposed within the right earpiece. The reflected sound received at the microphone of the right earpiece may be conveyed to the processor disposed in the left earpiece over a magnetic inductance linkage between the left earpiece and the right earpiece. The sound transduced at the speaker of the left earpiece may be based on a sound signal generated at the left earpiece which includes one or more randomized components. The sound transduced at the speaker of the right earpiece may be based on a sound signal generated at the left earpiece which includes one or more randomized components and wherein the sound signal may be communicated from the left earpiece to the right earpiece over the magnetic inductance linkage between the left earpiece and the right earpiece. The sound transduced at the speaker of the left earpiece may be different from the sound transduced at the speaker of the right earpiece. The sound at the speaker of the left earpiece may include frequencies above 20 kHz and the sound at the speaker of the right earpiece includes frequencies above 20 kHz. The left earpiece may further include data storage and the known properties for a user identity may be stored within the data storage. The method may further include verifying the identity of the user based on comparison of a voice sample of the user with metrics associated with a voice sample associated with the user identity. The method may further include verifying the identity of the user by sensing heart rate data of the user using one or more sensors of the left earpiece or the right earpiece, determining heart rate variability using the heart rate data, and determining that the heart rate variability substantially matches stored heart rate variability data associated with the user identity.

DETAILED DESCRIPTION

Figure 1:
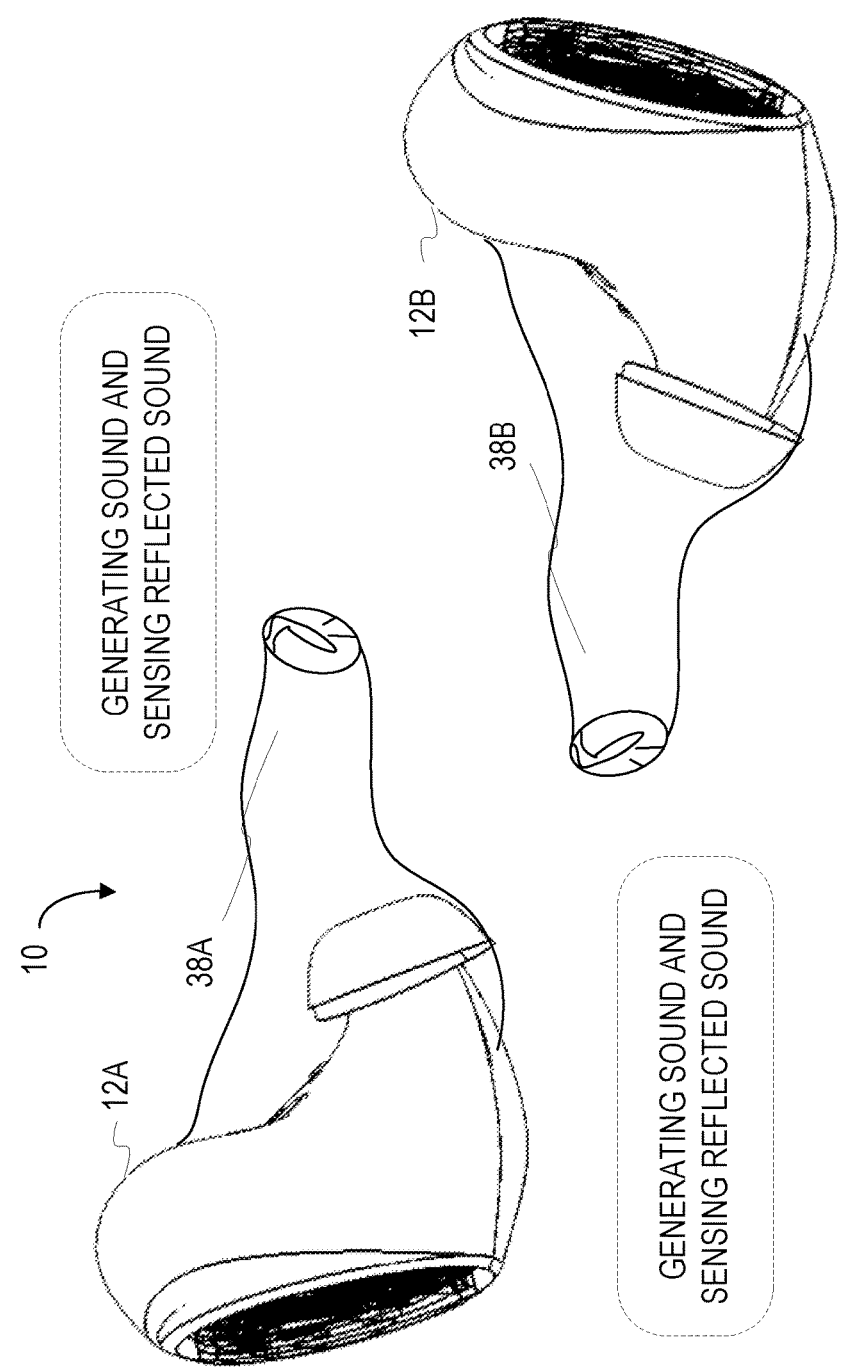
FIG. 1 is a pictorial representation of one example of the invention.

FIG. 1 illustrates a set of wireless earpieces 10. The set of wireless earpieces 10 includes a left earpiece 12A and a right earpiece 12B. Each earpiece 12A, 12B is sized and shaped to fit to an external auditory canal of a user, with the left earpiece 12A fitting into the left external auditory canal 38A of a user and the right earpiece 12B fitting into the right external auditory canal 38B of the user. It should be noted that the left external auditory canal 38A of the user and the right external auditory canal 38B of the user are generally of different shapes and have other structural variations and even where such variations are minor, results in the ear canals being of different size and/or shape and not identical.

Each of the wireless earpieces 12A, 12B provides for generating sound and sensing reflected sound. This may be performed with one or more speakers or other transducers to generate the sound and one or more microphones to sense the reflected sounds. It should be noted that the microphones are positioned to detect the sound within the external auditory canal (internal) as opposed to being positioned to detect ambient or environmental sounds (external). The microphones may be air conduction microphones or bone conduction microphones.

In operation, each earpiece may generate sounds and sense reflected sound. An analysis may then be performed to characterize features of the ear of the user such as size or shape or other properties of the external auditory canal of the user. The analysis can take on any number of different forms. For example, differences between the sound(s) generated and the reflected sound(s) may be determined to determine a transfer function indicative of properties of the external auditory canal. The sound(s) generated and the reflected (sounds) may be complex sounds with components at a plurality of different frequencies. Thus, physical properties of external auditory canal of the user do not need to be known or mapped in order to determine a transfer function. The transfer function or other results of the analysis may then be compared to known information stored on one or more of the earpieces in order to verify the identity of the user. More than one sound or a series of sounds may be generated. In some embodiments, the sounds may be outside of normal human hearing, (e.g. over 20 kHz) or else components of the sounds may be outside of normal human hearing. One advantage of using such sounds is that the user need not be made aware of or inconvenienced by the particular process used to verify their identity.

In order to provide enhanced security or alternative security additional biometric or physiological sensing may occur. This may include sensing heart rate in order to use heart rate variability to identify a user such as with a heart rate sensor or pulse oximeter. This may include sensing gait or other movements with one or more inertial sensors. This may include analyzing voice samples to provide voice analysis indicative of identity. This may include receiving user input such as a gesture or set of gestures indicating a password, or other forms of analysis.

Figure 2:
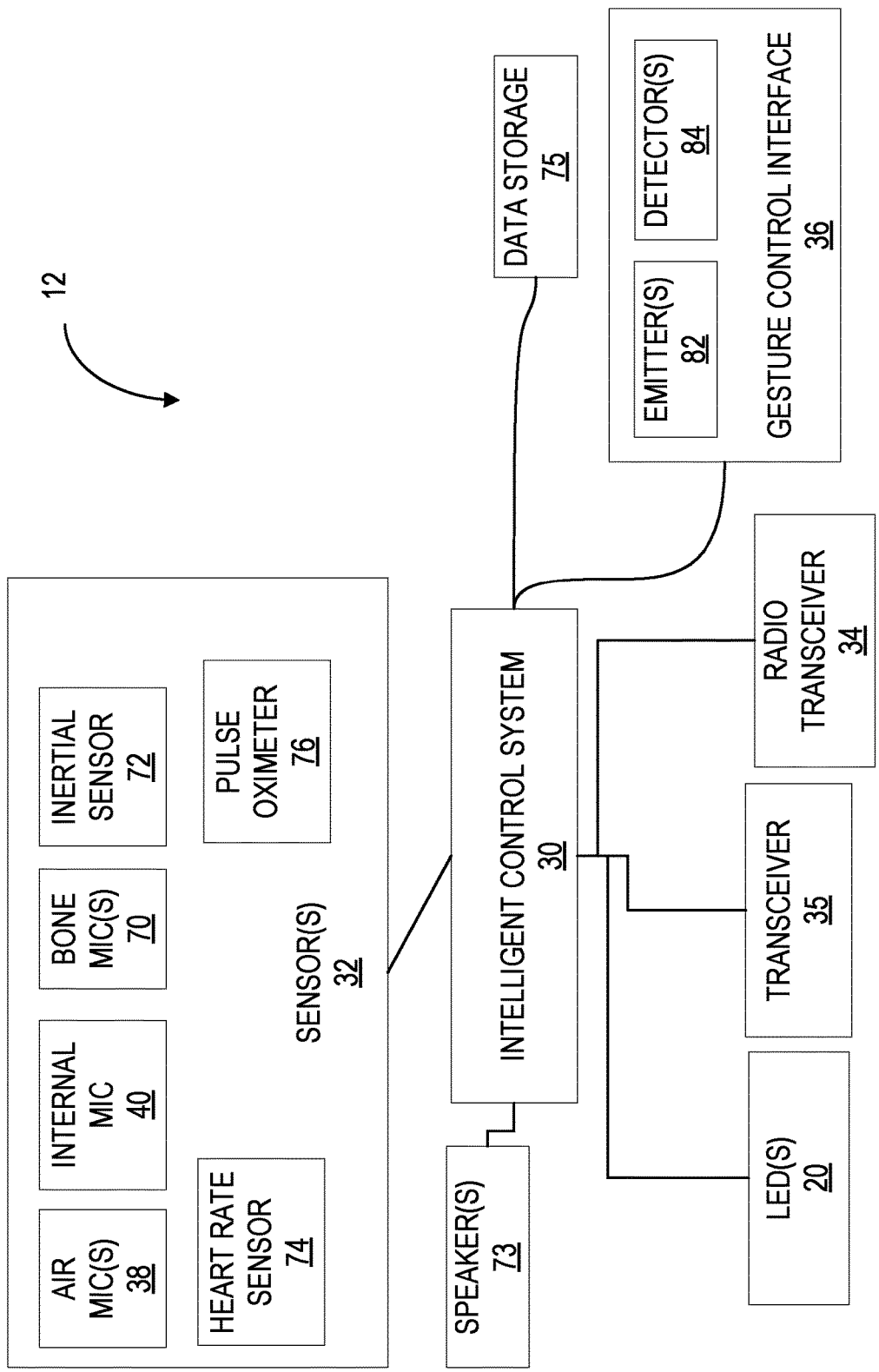
FIG. 2 is a block diagram of one example of an earpiece.

FIG. 2 illustrates a block diagram of one embodiment of an earpiece 12. The earpiece 12 may be a left earpiece or a right ear piece. It is noted that the left earpiece and a right earpiece may have different functionality and thus do not necessarily require all of the same components. As shown in FIG. 2, there are a plurality of sensors 32 present. The sensors 32 include an "internal" microphone 40. As used herein, an "internal microphone" is one that is used to sense air and/or bone vibrations within the external auditory canal of a user so as to detect sound reflections. One or more other sensors may be present including an air microphone 38 such as may be used to detect ambient sound and/or speech, a bone microphone 70 which may be used to detect speech of an individual, an inertial sensor 72 which may be a 9-axis inertial sensor which provides a 3-axis accelerometer, a 3-axis gyroscope, and a 3-axis compass. A heart rate sensor 74 may also be present to detect heart rate. The heart rate sensor 74 may be of various types such as using two electrodes or using infrared emissions and detections. A pulse oximeter 76 may also be present which may be used to provide oxygen saturation, pulse rate, or other data. Each of the sensors 32 is operatively connected to an intelligent control system 30. The intelligent control system 30 may include one or more processors, digital signal processors, or other types of intelligent control in addition to associated hardware and software. The intelligent control system 30 may be programmed or otherwise configured to verify identify of a user through generating sounds at the external auditory canal of a user and sensing reflected sounds. The intelligent control system 40 may further be programmed or otherwise configured to further verify identity of the user using one or more secondary biometric sensors such as the heart rate sensor 74, the pulse oximeter 76, or the inertial sensor 72. For example, the heart rate sensor 74 may be used to detect heart rate variability which may be associated with an individual.

Similarly, the pulse oximeter 76 may also be used to detect heart rate variability which may be associated with an individual. Similarly, inertial sensor 72 may be used to perform gait analysis to identify a user. See e.g. Ho, Chiung Ching, et al. "An unobtrusive Android person verification using accelerometer based gait." *Proceedings of the 10th International Conference on Advances in Mobile Computing & Multimedia*. ACM, 2012, hereby incorporated by reference in its entirety.

One or more speakers 73 are also operatively connected to the intelligent control system 30 and may be used in the conventional manner in addition to be being used to transduce audio which is reflected within the external auditory canal of an ear of a user. Data storage 75 is also operatively connected to the intelligent control system 30. The data storage 75 may be a memory such as a solid-state memory or other memory which may be used for various purposes. One such purpose may be to store information on user identities. Thus, for example, when a transfer function is determined for audio which is transduced and reflected back from a user's external auditory canal, the transfer function may be compared to that which is stored within the data storage 75 for one or more users.

One or more LEDs 20 may be operatively connected to the intelligent control system 30. The LEDs may be used to convey operational status of the earpiece. For example, one color may be used prior to user verification and another color may be used after user verification. Alternatively, or in addition, one or more LEDs 20 may blink or flash while user verification is being performed.

A radio transceiver 34 is operatively connected to the intelligent control system 30. The transceiver 35 may be a BLUETOOTH transceiver, a BLE transceiver, a Wi-Fi transceiver, or other type of radio transceiver. An additional transceiver 35 is also shown. The transceiver 35 may be a magnetic induction transceiver such as a near field magnetic induction transceiver, or other type of transceiver. In one embodiment, a left and a right earpiece may communicate using the transceiver 35.

A gesture control interface 36 is also operatively connected to the intelligent control system 30. The gesture control interface provides for receiving input from a user in the form of gestures. Examples of gestures may include taps, swipe, double taps, tap and holds, or other gestures. In one embodiment, the gesture interface 36 may be implemented using one or more emitters 82 and one or more detectors 84. Different types of energy may be emitted and detected, with changes in the energy emitted and detected indicative of gestures being performed by the user. One form of energy may be light with the emitters being light emitters and the detectors being light detectors or photo-detectors.

In operation, a set of wireless earpieces include the earpiece may be used in verifying an identity of a user. The method may include transducing sound at a speaker of the left earpiece to direct the sound towards a left external auditory canal of the user. The method may include receiving reflected sound at a microphone of the left earpiece, the microphone of the left earpiece positioned to receive reflections from the sound transduced at the speaker of the left earpiece and reflected from the left external auditory canal of the user. Similarly, the method may further include transducing sound at a speaker of the right earpiece to direct the sound towards a right external auditory canal of the user. The method may further include receiving reflected sound at a microphone of the right earpiece, the microphone of the right earpiece positioned to receive reflections from the sound transduced at the speaker of the right earpiece and reflected from the right external auditory canal of the user. The method may further include processing the reflected sound received at the microphone of the left earpiece to determine a property of the left external auditory canal of the user and processing the reflected sound received at the microphone of the right earpiece to determine a property of the right external auditory canal of the user. The method may further include determining if both the property of the left external auditory canal of the user and the property of the right external auditory canal of the user match known properties for a user identity and if so, verifying the identity of the user. In one embodiment, the property may be a transfer function, or other description of differences between sounds transduced and reflected sounds detected. The processing for each external auditory canal may occur independently at the left earpiece and the right earpiece. Alternatively, the processing may all occur at either the left earpiece or the right earpiece. To do, so the reflected sound signal may be conveyed from the earpiece not performing the processing to the earpiece performing the processor such as over a magnetic induction link. Alternatively, still, the processing may occur not within the set of wireless earpieces but remotely such as at a mobile device, computer, or remote server. Results of the processing, wherever it occurs, may compared to information on the earpiece such as on the data storage of the earpiece or stored elsewhere.

The sounds generated need not be the same for the left ear as the right ear. The sounds generalized may include random components in order to increase security, such that knowledge of a sound signal and a reflected sound signal for an individual would be insufficient to defeat security. As previously explained, the sound signals may include frequencies above normal human hearing, such as frequencies above 20 kHz.

Where additional biometric information is used, the additional biometric information may be a voice sample of the user. Various metrics of this speech may be determined such as jitter rates, shimmer rates, or other metrics used to verify a user identity based on metrics associated with known users. Alternatively, heart rate variability, or other biometrics may be used.

Figure 3:
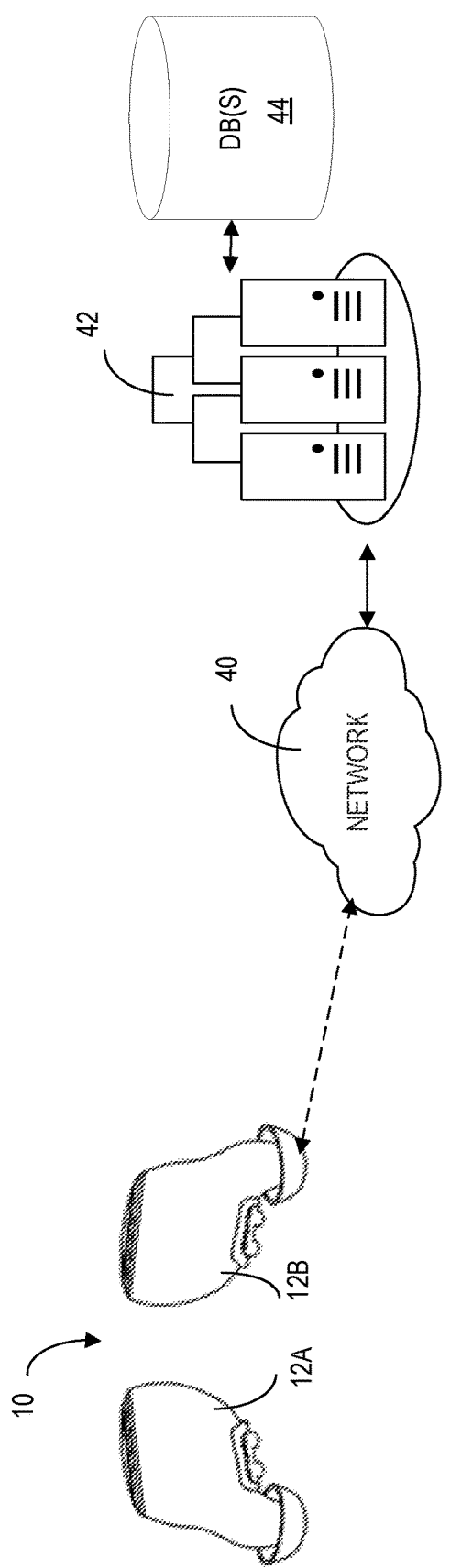
FIG. 3 is a diagram illustrating communication of the set of wireless earpieces over a communications network.

FIG. 3 illustrates another example of a system. In the system shown in FIG. 3, identity verification may be performed across a network. A set of wireless earpieces 10 includes a left earpiece 12A and a right earpiece 12B. The set of wireless earpieces 10 is in operative communication with a network 40. One or more intermediary devices (not shown) may be used including mobile devices, or other devices which have network access and which can also communicate with the set of wireless earpieces. Alternatively, the set of wireless earpieces 10 may communicate directly over the network such as when the set of wireless earpieces 10 includes a Wi-Fi transceiver. A server platform 42 is operatively connected to the network 40. One or more databases 44 are accessible through the server platform 42. In operation, in order to verify identify of a user, an audio signal transduced at an earpiece as well as a reflected audio signal detected at the earpiece may be communicated over the network 40 to the server platform. The server platform 40 may then perform processing on the audio signals such as to generate a transfer function, or to otherwise analyze the audio signals. Results of the analysis may then be compared to results within the database 44. If there is a match or substantial match, then the server platform 40 may communicate over the network 40 with the set of wireless earpieces 10 to indicate the identity of the match. Additional information may be stored in the database 44 such as the identification of devices associated with particular individuals. Additional biometric information may also be communicated over the network to provide an additional layer of verification.

Therefore, various methods, systems, and apparatus have been shown and described. Although specific embodiments have been shown, it is to be understood that numerous variations are contemplated. For example, although separate left and right earpieces of an ear bud style form factor are shown, the left and right earpieces may be left and right ear portions of a set of headphones with a headband spanning therebetween.

What is claimed is:

1. A method of verifying an identity of a user using a set of earpieces comprising a left earpiece and a right earpiece, the method comprising:

transducing sound at a speaker of the left earpiece to direct the sound towards a left external auditory canal of the user;

receiving reflected sound at a microphone of the left earpiece, the microphone of the left earpiece positioned to receive reflections from the sound transduced at the speaker of the left earpiece and reflected from the left external auditory canal of the user;

transducing sound at a speaker of the right earpiece to direct the sound towards a right external auditory canal of the user;

receiving reflected sound at a microphone of the right earpiece, the microphone of the right earpiece positioned to receive reflections from the sound transduced at the speaker of the right earpiece and reflected from the right external auditory canal of the user;

processing the reflected sound received at the microphone of the left earpiece to determine a property of the left external auditory canal of the user and processing the reflected sound received at the microphone of the right earpiece to determine a property of the right external auditory canal of the user;

determining if both the property of the left external auditory canal of the user and the property of the right external auditory canal of the user match known properties for a user identity and if so, verifying the identity of the user;

wherein the reflected sound received at the microphone of the left earpiece is conveyed to the processor disposed in the left earpiece over a magnetic inductance linkage between the left earpiece and the right earpiece;

wherein the sound transduced at the speaker of the left earpiece is based on a sound signal generated at the left earpiece which includes one or more randomized components;

wherein the sound transduced at the speaker of the right earpiece is based on a sound signal generated at the left earpiece which includes one or more randomized components and wherein the sound signal is communicated from the left earpiece to the right earpiece over the magnetic inductance linkage between the right earpiece and the left earpiece; and wherein the sound transduced at the speaker of the left earpiece is different from the sound transduced at the speaker of the right earpiece.

2. The method of claim 1 wherein the processing the reflected sound received at the microphone of the left earpiece to determine the property of the left external auditory canal of the user and processing the reflected sound received at the microphone of the right earpiece to determine the property of the right external auditory canal of the user.

3. The method of claim 1 wherein the sound at the speaker of the left earpiece includes frequencies above 20 kHz and wherein the sound at the speaker of the right earpiece includes frequencies above 20 kHz.

4. The method of claim 1 wherein left earpiece comprises data storage and wherein the known properties for a user identity are stored within the data storage.

5. The method of claim 1 further comprising further verifying the identity of the user based on comparison of a voice sample of the user with metrics associated with a voice sample associated with the user identity.

6. The method of claim 1 further comprising further verifying the identity of the user by sensing heart rate data of the user using one or more sensors of the left earpiece or the right earpiece, determining heart rate variability using the heart rate data, and determining that the heart rate variability substantially matches stored heart rate variability data associated with the user identity.

7. A method of verifying an identity of a user using a set of earpieces comprising a left earpiece and a right earpiece, the method comprising:
  transducing sound at a speaker of the left earpiece to direct the sound towards a left external auditory canal of the user;
  receiving reflected sound at a microphone of the left earpiece, the microphone of the left earpiece positioned to receive reflections from the sound transduced at the speaker of the left earpiece and reflected from the left external auditory canal of the user;
  transducing sound at a speaker of the right earpiece to direct the sound towards a right external auditory canal of the user;
  receiving reflected sound at a microphone of the right earpiece, the microphone of the right earpiece positioned to receive reflections from the sound transduced at the speaker of the right earpiece and reflected from the right external auditory canal of the user;
  processing the reflected sound received at the microphone of the left earpiece to determine a property of the left external auditory canal of the user and processing the reflected sound received at the microphone of the right earpiece to determine a property of the right external auditory canal of the user;
  determining if both the property of the left external auditory canal of the user and the property of the right external auditory canal of the user match known properties for a user identity and if so, verifying the identity of the user;
  wherein the reflected sound received at the microphone of the right earpiece is conveyed to the processor disposed in the left earpiece over a magnetic inductance linkage between the left earpiece and the right earpiece;
  wherein the sound transduced at the speaker of the right earpiece is based on a sound signal generated at the right earpiece which includes one or more randomized components;
  wherein the sound transduced at the speaker of the left earpiece is based on a sound signal generated at the right earpiece which includes one or more randomized components and wherein the sound signal is communicated from the right earpiece to the left earpiece over the magnetic inductance linkage between the left earpiece and the right earpiece; and
  wherein the sound transduced at the speaker of the left earpiece is different from the sound transduced at the speaker of the right earpiece.

8. The method of claim 7 wherein the processing the reflected sound received at the microphone of the left earpiece to determine the property of the left external auditory canal of the user and processing the reflected sound received at the microphone of the right earpiece to determine the property of the right external auditory canal of the user.

9. The method of claim 7 wherein the sound transduced at the speaker of the left earpiece is based on a sound signal generated at the left earpiece which includes one or more randomized components.

10. The method of claim 7 wherein the sound at the speaker of the left earpiece includes frequencies above 20 kHz and wherein the sound at the speaker of the right earpiece includes frequencies above 20 kHz.

11. The method of claim 7 wherein left earpiece comprises data storage and wherein the known properties for a user identity are stored within the data storage.

12. The method of claim 7 further comprising further verifying the identity of the user based on comparison of a voice sample of the user with metrics associated with a voice sample associated with the user identity.

13. The method of claim 7 further comprising further verifying the identity of the user by sensing heart rate data of the user using one or more sensors of the left earpiece or the right earpiece, determining heart rate variability using the heart rate data, and determining that the heart rate variability substantially matches stored heart rate variability data associated with the user identity.

* * * * *